US009124321B2

(12) United States Patent
Wu et al.

(10) Patent No.: US 9,124,321 B2
(45) Date of Patent: Sep. 1, 2015

(54) METHOD AND APPARATUS FOR TRANSMITTING PRECODING MATRIX INDEX AND PREFORMING PRECODING

(71) Applicant: Huawei Technologies Co., Ltd., Shenzhen (CN)

(72) Inventors: Qiang Wu, Beijing (CN); Mattias Frenne, Uppsala (SE); Weijun Sun, Beijing (CN); Yongxing Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/565,979

(22) Filed: Dec. 10, 2014

(65) Prior Publication Data

US 2015/0085955 A1 Mar. 26, 2015

Related U.S. Application Data

(63) Continuation of application No. 14/249,105, filed on Apr. 9, 2014, now Pat. No. 8,982,983, which is a continuation of application No. 13/667,402, filed on Nov. 2, 2012, now Pat. No. 8,731,043, which is a continuation of application No. PCT/CN2011/073632, filed on May 4, 2011.

(30) Foreign Application Priority Data

May 4, 2010 (CN) .......................... 2010 1 0169491

(51) Int. Cl.
*H04B 7/10* (2006.01)
*H04B 7/04* (2006.01)
(Continued)

(52) U.S. Cl.
CPC ............ *H04B 7/0456* (2013.01); *H04B 7/0478* (2013.01); *H04B 7/0482* (2013.01);
(Continued)

(58) Field of Classification Search
CPC ....................................................... H04B 7/10
See application file for complete search history.

(56) References Cited

U.S. PATENT DOCUMENTS

2007/0189151 A1  8/2007  Pan et al.
2008/0186212 A1  8/2008  Clerckx et al.
(Continued)

FOREIGN PATENT DOCUMENTS

CN  101170386 A   4/2008
CN  101547035 A1  9/2009
(Continued)

OTHER PUBLICATIONS

Huawei, "DL Codebook for 8 TX" Agenda Item 6.3.4, 3GPP TSG RAN WG1#61. Montreal, Canada, May 10-14, 2010, 7 pages.
(Continued)

*Primary Examiner* — Jaison Joseph
(74) *Attorney, Agent, or Firm* — Brinks Gilson & Lione

(57) ABSTRACT

A method and an apparatus for sending a Precoding Matrix Index (PMI) and performing precoding are provided in the embodiments of the present invention. The method for sending the PMI comprises the following steps: a user equipment acquires the transmission channel capability of carrying the PMI; according to the transmission channel capability of carrying the PMI, the precoding matrices are selected from a locally-stored first codebook set to form a second codebook set; a first precoding matrix is selected from the second codebook set; an index corresponding to the first precoding matrix is sent to a base station over the transmission channel so as to make the base station can find out the first precoding matrix according to the index and precode the data according to the first precoding matrix. The embodiments of the present invention can realize the flexible configuration and use of the PMI.

20 Claims, 3 Drawing Sheets

(51) Int. Cl.
*H04B 7/06* (2006.01)
*H04L 25/03* (2006.01)
*H04W 72/04* (2009.01)

(52) U.S. Cl.
CPC ........ *H04B7/0639* (2013.01); *H04L 25/03904* (2013.01); *H04L 25/03942* (2013.01); *H04L 25/03949* (2013.01); *H04W 72/0413* (2013.01); *H04B 7/0469* (2013.01); *H04B 7/0663* (2013.01); *H04B 7/10* (2013.01)

(56) References Cited

U.S. PATENT DOCUMENTS

| | | | |
|---|---|---|---|
| 2009/0080549 A1 | 3/2009 | Khan et al. | |
| 2010/0014608 A1 | 1/2010 | Lee et al. | |
| 2010/0172430 A1* | 7/2010 | Melzer et al. | 375/267 |
| 2011/0194638 A1* | 8/2011 | Erell et al. | 375/267 |
| 2011/0249637 A1 | 10/2011 | Hammarwell et al. | |
| 2011/0268207 A1* | 11/2011 | Choi et al. | 375/267 |
| 2012/0020288 A1* | 1/2012 | Liu et al. | 370/328 |
| 2012/0250751 A1 | 10/2012 | Kim | |

FOREIGN PATENT DOCUMENTS

| | | |
|---|---|---|
| CN | 101635612 A1 | 1/2010 |
| CN | 101669299 A | 3/2010 |
| RU | 2008-136-372 | 3/2010 |
| WO | WO 2007/029241 A1 | 3/2007 |
| WO | WO 2009/157715 A2 | 12/2009 |
| WO | WO 2010/024582 A2 | 3/2010 |

OTHER PUBLICATIONS

Huawei, "Downlink 8TX codebook considerations" Agenda Item 7.2.4.4, 3GPP TSG RAN WG1#59bis. Valencia, Spain, Jan. 18-22, 2010, R1-100256, 12 pages.

Huawei, "Extensions to Rel-8 type CQI/PMI/RI feedback using double codebook structure" Agenda Item 7.2.4.1, 3GPP TSG RAN WG1#59bis. Valencia, Spain, Jan. 18-22, 2010, R1-100251, 4 pages.

Jindal, Nihar, "MMO Broadcast Channels with Finite-Rate Feedback," IEEE Transactions on Information Theory, vol. 52, No. 11, 2006, pp. 5045-5060.

LTE, "3rd Generation Partnership Project; Technical Specification Group Radio Access Network; Evolved Universal Terrestrial Radio Access (E-UTRA); Physical layer procedures" (Release 9) 3GPP TS 36.213, V9.1.0, Mar. 2010, 9 pages.

LTE, "3rd Generation Partnership Project; Technical Specification Group Radio Access Network; Evolved Universal Terrestrial Radio Access (E-UTRA); Multiplexing and channel coding," (Release 9) 3GPP TS 36.212, V9.1.0, Mar. 2010, 61 pages.

Texas Instruments, "Possible Refinement on 8Tx Codebook Design" Agenda item 6.3.4.1, 3GPP TSG RAN WG1 60bis. Beijing, China, Apr. 12-16, 2010, 7 pages.

Qualcomm Inc., "Clarify CQI/PMI/RI definition for mode 8" Draft Change Request 36.213 CR rev 9.0.1, 3GPP TSG-RAN1 Meeting #60. San Francisco, USA, Feb. 22-26, 2010, 4 pages.

* cited by examiner

METHOD AND APPARATUS FOR TRANSMITTING PRECODING MATRIX INDEX AND PREFORMING PRECODING

CROSS-REFERENCE

This application is a continuation of U.S. application Ser. No. 14/249,105, filed on Apr. 9, 2014, which is a continuation of U.S. application Ser. No. 13/667,402, filed on Nov. 2, 2012, which is a continuation of International Application No. PCT/CN2011/073632, filed on May 4, 2011, which claims priority to Chinese application No. 201010169491.4, filed on May 4, 2010, which is incorporated herein by reference in its entirety.

TECHNICAL FIELD

The present invention relates to the field of communication technology, and more specifically, to a method and apparatus for PMI (Precoding matrix Index) transmission and precoding.

DESCRIPTION OF THE RELATED ART

In 3GPP (3rd Generation Partnership Project) LTE (Long Term Evolution) R10, eight antennas are introduced into a BS (Base Station). There are two configurations for antenna arrangement: a ULA antenna configuration as shown in FIG. 1, and a bipolarization antenna configuration as shown in FIG. 2. With respect to discussions about current 8-antenna codebooks in 3GPP, there is an agreement as follows. Current precoding is composed of two sections:

$$W = W_1 W_2 \quad (1)$$

wherein, $W_1$ belongs to a codebook set $C_1$, $W_2$ belongs to another codebook set $C_2$. $W_1$ mainly represents a wideband/long-term channel characteristic; $W_2$ represents a subband/short-term channel characteristic.

In 3GPP LTE R8, PMI (Precoding Matrix Index) information can be reported over PUCCH (Physical Uplink control CHannel) or PUSCH (Physical Uplink Shared CHannel), wherein PMI information includes at most 4 bits.

In the prior art, it is unable to achieve flexible configuration or utilization of PMI according to transmission channel conditions.

SUMMARY OF THE INVENTION

A method for transmitting PMI is provided in an aspect of this invention, capable of achieving flexible configuration and utilization of PMI, includes: selecting a first precoding matrix from a second codebook set by a user equipment (UE), wherein the second codebook set is set up according to a capability of a transmission channel to carry PMI; transmitting, by the UE, an index item corresponding to the first precoding matrix to a base station (BS) over the transmission channel, so as to enable the BS to search for the first precoding matrix according to the index item and perform precoding on data according to the first precoding matrix.

A method for precoding capable of achieving flexible configuration and utilization of PMI is provided in another aspect of this invention, includes: receiving, by a base station (BS), an index item corresponding to a first precoding matrix transmitted by a user equipment (UE) over a transmission channel, wherein the first precoding matrix is selected from a second codebook set by the UE, and the second codebook set is set up according to the capability of the transmission channel to carry PMI; searching for, by the BS, the first precoding matrix in a third codebook set locally stored according to the index item, and performing precoding on data according to the first precoding matrix, wherein the third codebook set is identical to the second codebook set.

A UE capable of achieving flexible configuration and utilization of PMI is provided in still another aspect of this invention, includes: a selecting unit, configured to select a first precoding matrix from a second codebook set, wherein the second codebook set is set up according to a capability of a transmission channel to carry PMI; a transmitting unit, configured to transmit an index item corresponding to the first precoding matrix to a base station (BS) over the transmission channel, so as to enable the BS to search for the first precoding matrix according to the index item, and perform precoding on data according to the first precoding matrix.

A BS is further provided according to another aspect of this invention, includes: a receiving unit, configured to receive an index item corresponding to a first precoding matrix transmitted by a user equipment (UE) over a transmission channel, wherein the first precoding matrix is selected from a second codebook set by the UE, and the second codebook set is set up according to a capability of a transmission channel to carry PMI; a precoding unit, configured to search for the first precoding matrix in a third codebook set locally stored by the BS according to the index item received by the receiving unit, and performing precoding on data according to the first precoding matrix, wherein the third codebook set is identical to the second codebook set.

In view of above aspects of this invention, precoding matrixes having difference accuracies can be selected according to the capability of the transmission channel to carry PMI to perform precoding on data transmitted from the BS to the UE, so as to achieve flexible configuration and utilization of PMI.

DETAILED DESCRIPTION OF THE PREFERRED EMBODIMENT

A clear, complete description will be given to technical solutions of embodiments of this invention in connection with accompanying drawings of embodiments of this invention. Obviously, embodiments described herein are merely some embodiments of this invention, but not all of them. Based on those embodiments of this invention, other embodiments can occur to those skilled in the art without any creative efforts, all of which fall within the scope of this invention.

Figure 3:
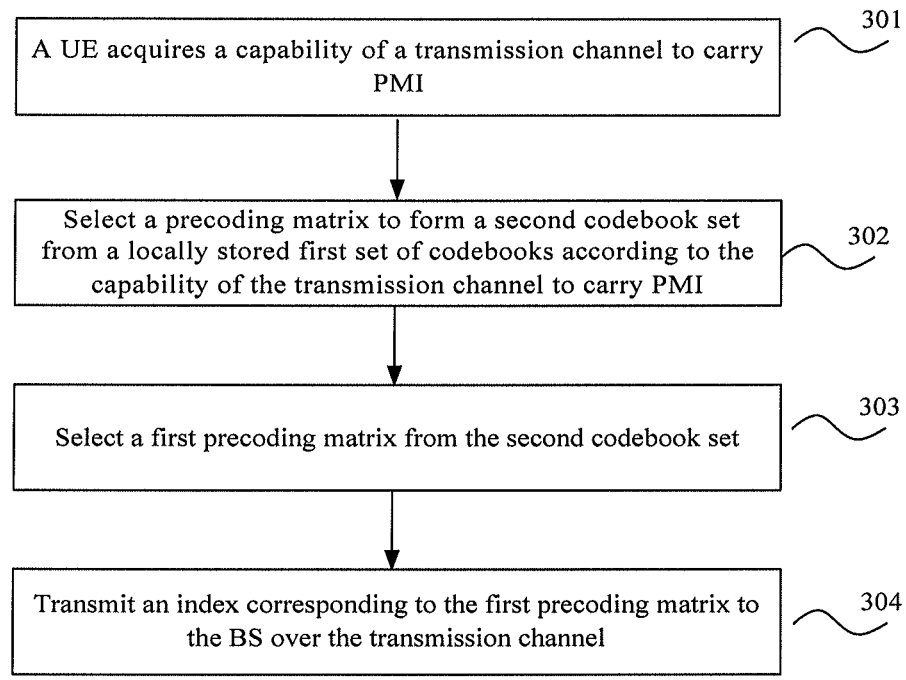
FIG. 3 is a flowchart of a method for transmitting PMI according to an embodiment of this invention.

FIG. 3 is a flowchart of a method for transmitting PMI according to an embodiment of this invention, including the following steps.

Step 301. A UE acquires a capability of a transmission channel to carry PMI.

In this embodiment, the transmission channel refers to a channel carrying or bearing PMI, for example, including: a PUCCH channel, a PUSCH channel, etc. The way to acquire the capability of the transmission channel to carry PMI may include: receiving a signaling for notifying PMI carrying capability of the transmission channel sent from a BS, or acquiring from a locally stored list of the capability of the transmission channel to carry PMI. The capability of a transmission channel to carry PMI refers to the maximum number of bits for carrying PMI on the transmission channel, for example, on a PUCCH channel at most 4 bits for carrying PMI, on a PUSCH channel at most 6 bits for carrying PMI. Such capability can be preconfigured according to data transmission requirements.

Optionally, at step 302, according to the capability of the transmission channel to carry PMI, the UE can select a precoding matrix from a first codebook set locally stored to form a second codebook set.

Particularly, all or a subset of the first codebook set can be selected as the second codebook set according to actual transmission channel conditions. The first codebook set may be a set of all codebooks used for precoding in UE data transmission and locally stored by the BS or the UE, separately.

The precoding matrix of the first codebook set may be in the form as follows.

$$W = \underbrace{\begin{pmatrix} DA & 0 \\ 0 & DAA \end{pmatrix}}_{W_1} \underbrace{\begin{pmatrix} I \\ X \end{pmatrix}}_{W_2} \quad (2)$$

In equation (2), assume the number of transmitting antennas is $N_t$ ($N_t$ is an even), the rank of the matrix is R, $W_1$ is a $N_t \times 2R$ matrix, $W_2$ is a $2R \times R$ matrix. I is $R \times R$ identity matrix, X is a $R \times R$ diagonal matrix, D is a $N_t/2 \times N_t/2$ diagonal matrix, A is a $N_t/2 \times R$ matrix, $\Lambda$ is a $R \times R$ diagonal matrix. Wherein, $$\Lambda = \begin{bmatrix} \alpha_1 & 0 & 0 \\ 0 & \ddots & 0 \\ 0 & 0 & \alpha_R \end{bmatrix} \quad X = \begin{bmatrix} \beta_1 & 0 & 0 \\ 0 & \ddots & 0 \\ 0 & 0 & \beta_R \end{bmatrix} \quad (3)$$

Figure 1:
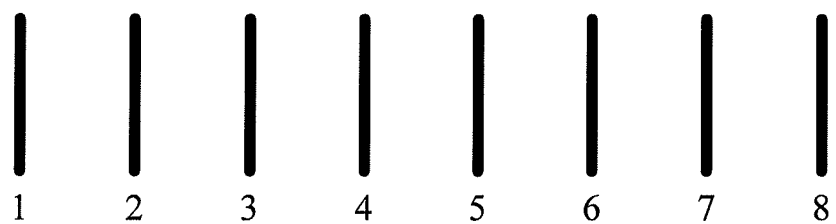
FIG. 1 is a schematic structural diagram of a ULA antenna in the prior art.
Figure 2:
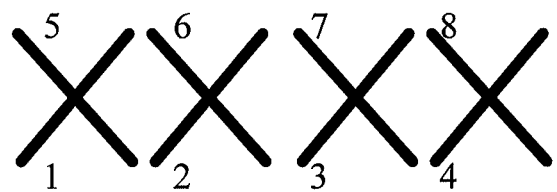
FIG. 2 is a schematic structural diagram of a bipolarization antenna in the prior art.

As to the bipolarization antennas shown in FIG. 2, $\Lambda$ and X are used to adjust the phase relationship between two sets of polarized antennas. $\alpha_i$, $\beta_i$ (i=1, . . . R) are scalars having modulus of 1.

Taking 8 transmit antennas and a precoding matrix having rank of 1 as an example, in the arrangement shown in FIG. 2, D is a 4*4 diagonal matrix, which can be represented with b bits, there are $T=2^b$ possible values.

$$D \in \left\{ \begin{pmatrix} 1 & 0 & 0 & 0 \\ 0 & e^{j\pi g/8} & 0 & 0 \\ 0 & 0 & e^{2j\pi g/8} & 0 \\ 0 & 0 & 0 & e^{3j\pi g/8} \end{pmatrix} \right\}, (g \in 0, \ldots T-1) \quad (4)$$

A can be obtained from an existing DFT (Discrete Fourier Transform) based codebook structure through the following equation.

$$e_m^{(g)} = \frac{1}{\sqrt{M}} \begin{bmatrix} w_{0m}^{(g)} & \cdots & w_{(M-1)m}^{(g)} \end{bmatrix}^T \quad (5)$$

$$w_{nm}^{(g)} = \exp\left\{ j \frac{2\pi n}{M} \left( m + \frac{g}{G} \right) \right\}$$

Wherein, M is the number of DFT dimensions, m=0, 1, . . . M−1; n=0, 1 . . . M−1. As to DFT corresponding to 4 antennas, M=4. G is the number of groups of DFT, g=0, 1, . . . , G−1. $e_m^{(g)}$ is a precoding vector in the codebook set, $w_{nm}^{(g)}$ represents various elements in $e_m^{(g)}$. For instance, in the case of G=2, four 4×1 precoding vectors can be obtained from each 4-dimensional DFT structure, and two DFT structures may produce eight 4×1 precoding vectors. Hence, if A is represented with 3 bits, the values of A can be obtained from the eight 4×1 precoding vectors. $\Lambda$ is a 1×1 matrix with values of points on a unit circle, and represented with b bits, for example. Thus, there are total $T=2^b$ possible values and its value can be $e^{j2\pi k/T}$ (k=0, . . . , T−1). For example, with a 1-bit representation, it has values (1,−1). $\Lambda$ and X are both 1×1 matrix with their values of points on a unit circle and represented with b bits, for example. Thus, there are total $T=2^b$ possible values and their value can be $e^{j2\pi k/T}$ (k=0, . . . , T−1).

Suppose that the first codebook set is represented with 7 bits. Because the function of D, A is to adjust the direction of beam transmission, they are totally represented with 5 bits. Assume that D is represented with 1 bit, in equation (4), g is set to 1 or −1 constantly.

$$D \in \left\{ \begin{pmatrix} 1 & 0 & 0 & 0 \\ 0 & 1 & 0 & 0 \\ 0 & 0 & 1 & 0 \\ 0 & 0 & 0 & 1 \end{pmatrix}, \begin{pmatrix} 1 & 0 & 0 & 0 \\ 0 & e^{j\pi g/8} & 0 & 0 \\ 0 & 0 & e^{2j\pi g/8} & 0 \\ 0 & 0 & 0 & e^{3j\pi g/8} \end{pmatrix} \right\} \quad (6)$$

A is represented with 4 bits. Because both $\Lambda$, X represent phase adjustments between two sets of antennas with different polarizations, they can be represented with 2 bits in total.

Through adjusting the bit numbers of D, A, $\Lambda$, X, the total number of bits of PMI can accord to carrying capability of a transmission channel. "Accord to" as mentioned herein means that the total number of bits representing D, A, $\Lambda$, X is identical to the number of bits that the transmission channel can transmit. For example, on a PUCCH channel, if PMI can be transmitted in at most 4 bits, the total number of bits of D, A, $\Lambda$, X is 4. It can be provided for the UE to have a constant D=I (identity matrix), X=I. If 3 bits are set for A and 1 bit for $\Lambda$, the PMI has total 4 bits. If the PMI is transmitted through PUSCH, the PMI may have 6 bits and the total number of bits of D, A, $\Lambda$, X is 6. In this context, D may be represented with 1 bit and $\Lambda$ may be set to I. A can be represented with 3 bits, X in 2 bits, and thus 6 bits in total. If a 7-bit PMI is transmitted on PUSCH, A can be represented with 4 bits, D with 1 bit, and X with 2 bits. A second codebook set is selected from the first codebook set. When the second codebook set is a subset of the first codebook set, the selecting criteria of the second codebook set focuses on partitioning the signal space as uniform as possible. For example, if the first codebook set includes 7 bits in total, while the second codebook set only can be represented with 4 bits, we can have that D=I, A can be represented with 3 bits, indicating 8 directions (the first codebook set may indicate 32 directions). In equation (5), make g=0, g=2, G=4, 8 approximately uniform directions can be obtained. Let X=I at the same time (or $\Lambda$=I, X is represented with 1 bit), $\Lambda$ is represented with 1 bit, with a range of values of 1 or −1 (in the case of 2 bits, a range of 1, −1, j, −j).

Optionally, in this step, the UE can directly select a codebook set suitable for the capability of the transmission channel to carry PMI as the second codebook set described above according to the carrying capability, as detailed in the following method embodiment of this invention.

Step 303. The UE selects a first precoding matrix for BS precoding according to the second codebook set.

When the UE selects precoding from the second codebook set, the selection can be made according to some specified criteria. References can be made to the prior art for particular selection criteria. For example, a precoding matrix leading to the maximum SNR of data can be selected as the first precoding matrix.

Step 304. An index corresponding to the first precoding matrix is sent to the BS over the transmission channel.

Because the index of the selected precoding matrix needs to be transmitted over the transmission channel, different precoding matrixes in the second codebook set can correspond to different index respectively, so as to represent those different precoding matrixes distinguishingly. The index corresponding to the first precoding matrix refers to, after the index has been established for precoding matrixes in the second codebook set, an index item corresponding to the first precoding matrix in the established index. For example, when PUCCH is used as the transmission channel, if the first codebook set comprises 32 codebook matrixes, and if PUCCH can use merely 4 bits for PMI transmission, then 16 codebook matrixes can be selected from the first codebook set to form the second codebook set, and 0-15 (represented with 4 bits) can be used as index of the above 16 codebook matrix. If a codebook matrix with index item 0 is selected as the first precoding matrix described above, the index item corresponding to the first precoding matrix can be represented as 0000; or if a codebook matrix of number 2 is selected as the first precoding matrix described above, the index item corresponding to the first precoding matrix can be represented as 0010.

In this embodiment, after the UE acquires transmission channel capability, a codebook set can be configured according to the channel capability, and PMI can be feedback to the BS, so that the BS can obtain PMI with different accuracies depending on carrying capabilities of UE transmission channels.

In another embodiment of this invention, the above method may further include:

Providing different sets of codebooks according to different the capabilities of the transmission channels to carry PMI in advanced, the selecting action at step 302 in the above embodiment can be omitted. That is, there are several different codebook sets provided to be selected by the UE in an original state, for example, the first codebook set and the second codebook set described above. This method differs from that of the above embodiment in that instead of selecting the second codebook set from the first codebook set, the first codebook set or the second codebook set can be selected directly according to the capabilities of the transmission channels to carry PMI.

Figure 4:
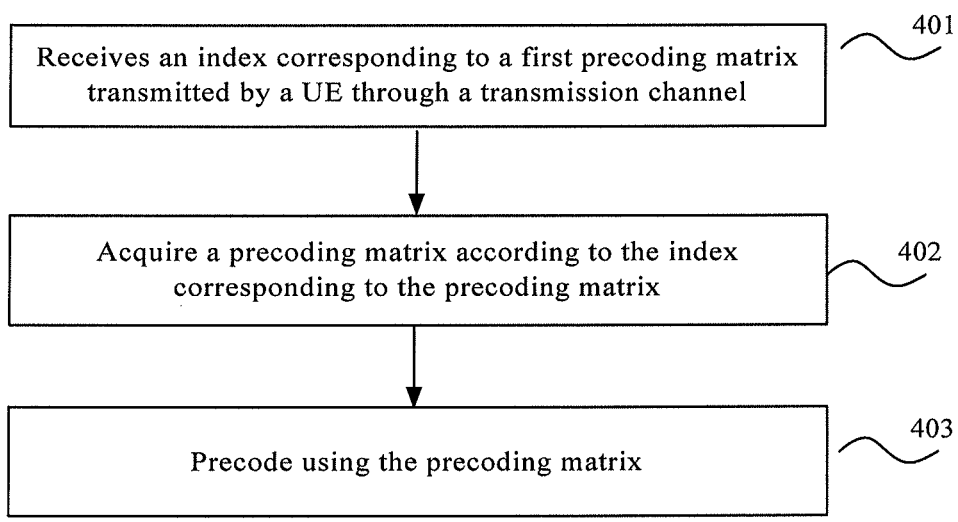
FIG. 4 is a flowchart of a precoding method according to an embodiment of this invention.

FIG. 4 is a flowchart of a precoding method according to an embodiment of this invention, including the following steps.

Step 401. ABS receives an index corresponding to a first precoding matrix transmitted by a UE over a transmission channel.

In this embodiment, the first precoding matrix is selected from a second codebook set, and the second codebook set is formed from precoding matrixes selected from the first codebook set stored locally on the UE. A reference can be made to the corresponding description in embodiment shown in FIG. 3 for the particular way of obtaining the second codebook set.

Step 402. The BS finds out the first precoding matrix according to the index corresponding to the first precoding matrix.

In this embodiment, the first precoding matrix can be found from a third codebook set locally stored according to the index, and then precoding can be performed on data according to the first precoding matrix, wherein the third codebook set is identical to the second codebook set. The term "identical" used herein means that the third codebook set contains the same items of precoding matrixes as the second codebook set does, and the precoding matrices contained in the third codebook set are the same as those contained in the second codebook set, and the same index item represents the same precoding matrix in the third codebook set and the second codebook set.

In this embodiment, the third codebook set may be predetermined by the BS according to the capability of the transmission channel to carry PMI or the type of the transmission channel. The way of establishing indexes corresponding to various precoding matrixes in the third codebook set is substantially the same as that of the embodiment shown in FIG. 3, which will not be repeated herein.

Step 403. The BS performs precoding using the precoding matrix obtained in step 403.

In this embodiment, the BS performs precoding on data sent to the UE using the PMI which fed back from the UE. Depending on different carrying capabilities of UE transmission channels, precoding matrixes with different accuracies can be obtained, so that flexible PMI configuration can be guaranteed and rational use of transmission channel resources can achieved.

Those skilled in the art may understand: some or all steps of the method of the above described embodiment can be realized with programs and instruction related hardware, the programs can be stored in a computer readable storage medium, such as, ROM/RAM, a magnetic disk, an optical disc, etc.

Figure 5:
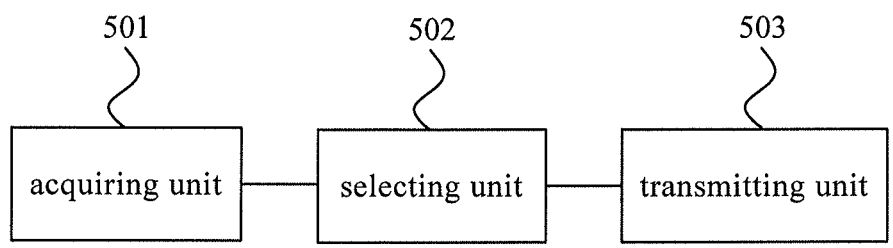
FIG. 5 is a schematic structural diagram of a UE according to an embodiment of this invention.

FIG. 5 is a schematic structural diagram of a UE according to an embodiment of this invention, which can realize the method provided in the above embodiment, the UE including:

an acquiring unit 501, configured to acquire the capability of the transmission channel to carry PMI;

a selecting unit 502, configured to select precoding matrixes from a first codebook set locally stored to form a second codebook set according to the capability of the transmission channel to carry PMI acquired by the acquiring unit 501, and then select a first precoding matrix for performing data precoding from the second codebook set;

a transmitting unit 503, configured to carry an index corresponding to the first precoding matrix selected by the selecting unit 502 over the transmission channel to transmit.

Description of corresponding methods of FIGS. 3 and 4 above can be referenced for interactions between various modules of the above UE and the BS, and particular implementation of functions of those various modules.

In this embodiment, after the UE acquires transmission channel capability, a codebook set used thereon can be configured according to the channel capability, and PMI can be feedback to the BS, so that the BS can obtained PMI with different accuracies depending on carrying capabilities of UE transmission channels.

Figure 6:
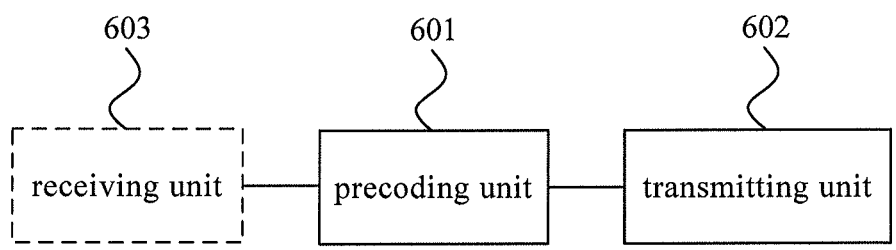
FIG. 6 is a schematic structural diagram of a BS according to an embodiment of this invention.

FIG. 6 is a schematic structural diagram of a BS according to an embodiment of this invention, capable of realizing the method provided in the embodiment above, the BS including:

a receiving unit 601, configured to receive an index corresponding to a first precoding matrix transmitted by a UE through a transmission channel, wherein the first precoding matrix is selected from a second codebook set by the UE, and the second codebook set is formed from precoding matrixes selected from a first codebook set locally stored on the UE;

a precoding unit 602, configured to search for the first precoding matrix in a third codebook set locally stored according to the index received by the receiving unit 601, and perform precoding on data according to the first precoding matrix, wherein the third codebook set is identical to the second codebook set.

In another embodiment of this invention, the BS further includes:

a transmitting unit 603, configured to transmit to the UE a signaling for notifying the UE of the capability of the transmission channel to carry PMI, so as to enable the UE to select precoding matrixes from the first codebook set to form the second codebook set. The UE and the BS can also predetermine the capabilities of the transmission channels to carry PMI in advance.

Description of corresponding methods of FIGS. 3 and 4 above can be referenced for interactions between various modules of the above UE and the BS, and particular implementation of functions of those various modules.

In this embodiment, the BS can set up PMI feedback capabilities of different transmission channels of a UE as required, so as to obtain PMI with different accuracies.

Note that all or some of above units can be integrated in a chip. Various functional units according to each embodiment of the present invention may be integrated in one processing module or may exist as separate physical units, or two or more units may also be integrated in one unit. The integrated module may be implemented through hardware, or may also be implemented in a form of a software functional module. When the integrated module is implemented in the form of the software functional module and sold or used as a separate product, the integrated module may be stored in a computer readable storage medium. The storage medium mentioned above may be ROM, a magnet disc or an optical disc.

The accompanying drawings and related description are merely for the illustration of the principle of this invention, and are not intended to limit the scope of this invention. For example, message names and entities in various embodiments can vary with networks, and some messages can be omitted. Any modifications, substitutions and improvements made in the spirit and principle of this invention are covered in the scope of this invention.

Although this invention has been illustrated and described according to some preferred embodiments of this invention, those skilled in the art may understand that various changes can be made in forms and details, without departing from the spirit and scope of this invention.

What is claimed is:

1. A method for transmitting a precoding matrix index (PMI), comprising:
   selecting a first precoding matrix from a second codebook set by a user equipment (UE), wherein the second codebook set is selected from a first codebook set locally stored on the UE according to a capability of a physical uplink control channel (PUCCH) to carry the PMI;
   transmitting, by the UE, an index item corresponding to the first precoding matrix to a base station (BS) over the PUCCH.

2. The method according to claim 1, wherein, when the second codebook set is a subset of the first codebook set, the second codebook set meets a criteria of uniformly partitioning the signal space.

3. The method according to claim 1, wherein each precoding matrix in the first codebook set locally stored is represented as $W=W_1 W_2$,
wherein, $$W_1 = \begin{pmatrix} DA & 0 \\ 0 & DA\Lambda \end{pmatrix}, W_2 = \begin{pmatrix} I \\ X \end{pmatrix},$$

$W_1$ is a $N_t \times 2R$ matrix,
$W_2$ is a $2R \times R$ matrix,
I is a $R \times R$ identity matrix,
X is a $R \times R$ diagonal matrix,
D is a $N_t/2 \times N_t/2$ diagonal matrix,
A is a $N_t/2 \times R$ matrix,
$\Lambda$ is a $R \times R$ diagonal matrix,
wherein $N_t$ is an even and represents the number of transmission antennas of the BS, R is the rank of the precoding matrix.

4. The method according to claim 3, wherein, when the rank is 1, the second codebook set is a subset of the first codebook set, and D and X are identity matrixes, wherein the method comprises:
   representing $\Lambda$ with 1 bit having a value range of 1 or −1.

5. The method according to claim 3, wherein, when the rank is 1, the second codebook set is a subset of the first codebook set, and D and X are identity matrixes, wherein the method comprises:
   representing 8 uniform directions by A with 3 bits.

6. A method for precoding, comprising:
   receiving, by a base station (BS), an index item corresponding to a first precoding matrix transmitted by a user equipment (UE) over a physical uplink control channel (PUCCH), wherein the first precoding matrix is selected from a second codebook set by the UE, and the second codebook set is selected from a first codebook set locally stored on the UE according to the capability of the PUCCH to carry a precoding matrix index (PMI);
   searching for, by the BS, the first precoding matrix in a third codebook set locally stored according to the index item, and performing precoding on data according to the first precoding matrix, wherein the third codebook set is identical to the second codebook set.

7. The method according to claim 6, wherein, when the second codebook set is a subset of the first codebook set, the second codebook set meets a criteria of uniformly partitioning the signal space.

8. The method according to claim 6, wherein each precoding matrix in the first codebook set is represented as $W=W_1 W_2$,
wherein, $$W_1 = \begin{pmatrix} DA & 0 \\ 0 & DA\Lambda \end{pmatrix}, W_2 = \begin{pmatrix} I \\ X \end{pmatrix},$$

$W_1$ is a $N_t \times 2R$ matrix,
$W_2$ is a $2R \times R$ matrix,
I is a $R \times R$ identity matrix,
X is a $R \times R$ diagonal matrix,
D is a $N_t/2 \times N_t/2$ diagonal matrix, A is a $N_t/2 \times R$ matrix, Λ is a $R \times R$ diagonal matrix, wherein $N_t$ is an even and represents the number of transmission antennas of the BS, R is the rank of the precoding matrix.

9. The method according to claim 8, wherein, when the rank is 1, the second codebook set is a subset of the first codebook set, and D and X are identity matrixes, wherein the method comprises:

representing Λ with 1 bit having a value range of 1 or −1.

10. The method according to claim 8, wherein, when the rank is 1, the second codebook set is a subset of the first codebook set, and D and X are identity matrixes, wherein the method comprises:

representing 8 uniform directions by A with 3 bits.

11. A user equipment (UE), comprising:

a selecting unit, configured to select a first precoding matrix from a second codebook set, wherein the second codebook set is selected from a first codebook set locally stored on the UE according to a capability of a physical uplink control channel (PUCCH) to carry a precoding matrix index (PMI);

a transmitter, configured to transmit an index item corresponding to the first precoding matrix to a base station (BS) over the PUCCH.

12. The UE according to claim 11, wherein, when the second codebook set is a subset of the first codebook set, the second codebook set meets a criteria of uniformly partitioning the signal space.

13. The UE according to claim 11, wherein, each precoding matrix in the first codebook set is represented as $W=W_1 W_2$, wherein, $$W_1 = \begin{pmatrix} DA & 0 \\ 0 & DAA \end{pmatrix}, W_2 = \begin{pmatrix} I \\ X \end{pmatrix},$$

$W_1$ is a $N_t \times 2R$ matrix, $W_2$ is a $2R \times R$ matrix,

I is a $R \times R$ identity matrix,

X is a $R \times R$ diagonal matrix,

D is a $N_t/2 \times N_t/2$ diagonal matrix,

A is a $N_t/2 \times R$ matrix,

Λ is a $R \times R$ diagonal matrix, wherein $N_t$ is an even and represents the number of transmission antennas of the BS, R is the rank of the precoding matrix.

14. The UE according to claim 13, wherein, when the rank is 1, the second codebook set is a subset of the first codebook set, and D and X are identity matrixes, wherein the matrix Λ is represented with 1 bit having a value range of 1 or −1.

15. The UE according to claim 13, wherein, when the rank is 1, the second codebook set is a subset of the first codebook set, and D and X are identity matrixes, wherein eight uniform directions are represented by A with 3 bits.

16. A base station (BS), comprising:

a receiver, configured to receive an index item corresponding to a first precoding matrix transmitted by a user equipment (UE) over a physical uplink control channel (PUCCH), wherein the first precoding matrix is selected from a second codebook set by the UE, and the second codebook set is selected from a first codebook set locally stored on the UE according to a capability of the PUCCH to carry a precoding matrix index (PMI);

a precoding unit, configured to search for the first precoding matrix in a third codebook set locally stored by the BS according to the index item received by the receiving unit, and perform precoding on data according to the first precoding matrix, wherein the third codebook set is identical to the second codebook set.

17. The BS according to claim 16, wherein, when the second codebook set is a subset of the first codebook set, the second codebook set meets a criteria of uniformly partitioning the signal space.

18. The BS according to claim 16, wherein each precoding matrix in the first codebook set is represented as $W=W_1 W_2$, wherein, $$W_1 = \begin{pmatrix} DA & 0 \\ 0 & DAA \end{pmatrix}, W_2 = \begin{pmatrix} I \\ X \end{pmatrix},$$

$W_1$ is a $N_t \times 2R$ matrix, $W_2$ is a $2R \times R$ matrix,

I is a $R \times R$ identity matrix,

X is a $R \times R$ diagonal matrix,

D is a $N_t/2 \times N_t/2$ diagonal matrix,

A is a $N_t/2 \times R$ matrix,

Λ is a $R \times R$ diagonal matrix, wherein $N_t$ is an even and represents the number of transmission antennas of the BS, R is the rank of the precoding matrix.

19. The BS according to claim 18, wherein, when the rank is 1, the second codebook set is a subset of the first codebook set, and D and X are identity matrixes, wherein Λ is represented with 1 bit having a value range of 1 or −1.

20. The BS according to claim 18, wherein, when the rank is 1, the second codebook set is a subset of the first codebook set, and D and X are identity matrixes, wherein eight uniform directions are represented by A with 3 bits.

* * * * *